June 18, 1968 C. R. BOICEY 3,388,462
METHOD OF PRODUCING MULTIPLE GLASS SHEET GLAZING UNITS
Original Filed March 29, 1965

INVENTOR.
Charles R. Boicey

United States Patent Office 3,388,462
Patented June 18, 1968

3,388,462
METHOD OF PRODUCING MULTIPLE GLASS SHEET GLAZING UNITS
Charles R. Boicey, Toledo, Ohio, assignor to Libbey-Owens-Ford Glass Company, Toledo, Ohio, a corporation of Ohio
Application Mar. 29, 1965, Ser. No. 443,342, which is a continuation-in-part of application Ser. No. 195,888, May 18, 1962. Divided and this application Oct. 18, 1965, Ser. No. 515,272
3 Claims. (Cl. 29—611)

This application is a division of copending application Ser. No. 443,342, filed Mar. 29, 1965, now abandoned, which in turn is a continuation-in-part of application Ser. No. 195,888, filed May 18, 1962, now abandoned.

The present invention relates broadly to a method of making multiple glass sheet glazing units and more particularly to a method of making units of the above character which are specially adapted for use on refrigerator cabinets.

Generally, the type of glazing unit with which this invention is concerned comprises spaced sheets of glass sealed together around their marginal edges to form an air space or chamber therebetween which may be filled with dehydrated air or other gases or exhausted to provide a partial vacuum. Such units are well known and have been widely used in various glazing applications to reduce the transfer of heat through sight openings and to retard condensation of moisture on the glass sheets.

Due to their insulating qualities, glazing units of the above-described character are particularly adapted for use in separating areas having a wide variation in atmospheric conditions such as temperature and humidity. For example, units of this general type are often used as windows in refrigerator cabinets or the like to permit viewing the goods stored within the refrigerated compartment without opening the cabinet and thereby exposing the compartment to the ambient atmosphere. The provision of a window in a refrigerator cabinet is of particular advantage when the cabinet is utilized as a display case for storing goods to be sold since the window permits the goods to be viewed by the prospective customer and, at the same time, to be maintained at their proper storing temperatures.

When used on refrigerator cabinets, one side of the window, hereinafter referred to as the cabinet side, is exposed to the cool atmosphere of the refrigerated compartment while the other side, hereinafter referred to as the room side, is exposed to the ambient atmosphere which normally is relatively warm. In order for the refrigerator unit to operate efficiently, it is important that heat transfer between the refrigerated compartment and the surrounding atmosphere be held to a minimum. Since there are no material limitations regarding the type or amount of insulation which may be incorporated into the walls of a refrigerator cabinet, while there is a practical limit as to the construction of the window, there is, in most instances, proportionally more heat transfer through the latter.

By utilizing a multiple sheet glazing unit as a window on the refrigerated cabinet, heat transfer through this window is greatly retarded as compared to windows comprising but a single pane of glass. The insulation properties of multiple sheet glazing units, however, are not sufficient to completely prevent the transfer of heat and, therefore, the room-side sheet is usually maintained at a temperature which is below the room temperature. If the surface of the glass is cooled to a temperature below the dew point temperature of the room atmosphere, moisture in the room atmosphere condenses on the surface of the glass. Any such condensation is not only unsightly and messy but also if it occurs in sufficient quantities, it interferes with clear vision through the window thus fustrating the intended purpose of the window.

The insulating and condensation preventing qualities in a multiple sheet glazing unit are sufficient to prevent condensation of moisture on the room-side surface of the window over a relatively wide range of room atmospheric conditions. However, when the room atmosphere is warm and humid, the dew point temperature becomes relatively high and in some instances above the temperature of the room-side surface of the glazing unit whereupon the undesirable condensation of moisture may occur.

Even if the temperature of the room side surface of the window remains sufficiently high to prevent the condensation of moisture on this surface, it will be appreciated that when the refrigerated cabinet is opened exposing the compartment to the room atmosphere, condensation quite readily forms on the inner surface of the compartment and thus on the cabinet-side surface of the window. When the compartment is again closed, the condensate on the inner surfaces is exposed to the frigid atmosphere of the compartment and thus is not readily dissipated but rather tends to freeze producing a highly opaque frost which further interferes with and quite often completely eliminates vision through the window.

It is therefore a primary object of the present invention to provide a method of making a multiple sheet glazing closure for a refrigerator cabinet or the like, which glazing closure remains substantially condensate and frost free at all times.

The invention also resides in an improved method for fabricating units of the above-described character having integral heating means.

Other objects and advantages of the invention will become more apparent during the course of the following description when taken in connection with the accompanying drawings.

In the drawings, wherein like numerals are employed to designate like parts throughout the same:

Figure 1:
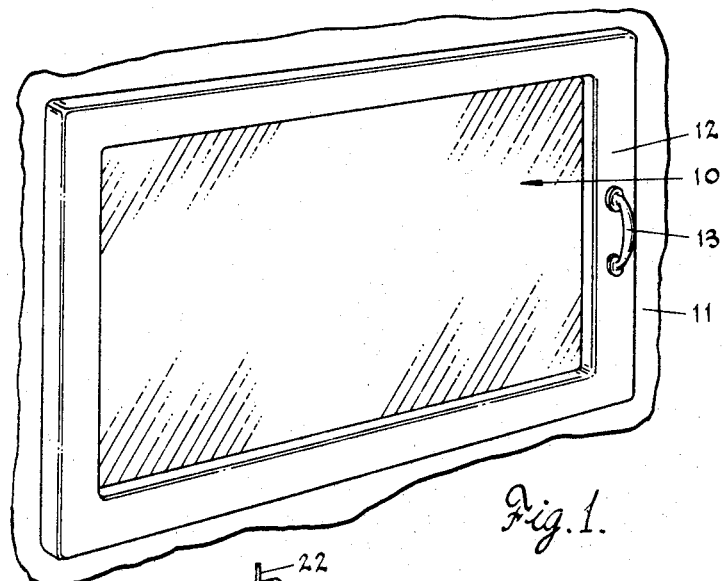
FIG. 1 is a perspective view of a multiple sheet glazing unit embodying the novel features of the present invention and mounted in a glazing opening.
Figure 2:
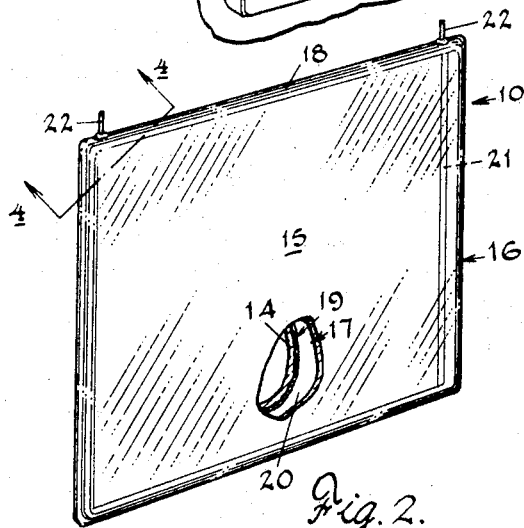
FIG. 2 is a perspective view of the complete unit having parts broken away and shown in section.

For purposes of illustration, the present invention is shown in the drawings embodied in a glazing unit 10 utilized as a window in a refrigerator cabinet 11. The unit is mounted in the window opening in a conventional manner offering a substantially air-tight seal between the unit and the wall in which it is mounted. In the exemplary embodiment, the window is located in a door 12 providing access to the refrigerated compartment. The door 12 is supported on the cabinet to move between open and closed positions through suitable means such as hinges to permit the door to swing relative to the cabinet or by channels adapted to loosely receive opposite edges of the door and permit it to slide back and forth on the cabinet. To facilitate opening and closing of the door 12, a handle 13 is conventionally provided and if the door is to be mounted by hinges, a latch means may be provided for releasably securing the door in the closed position.

Many different types of multiple sheet glazing units are known in the art, all of which may be described generally as comprising two sheets of glass 14 and 15 spaced apart in face-to-face relationship by an interposed separator means 16 and having their marginal edges sealed together to form a dead-air space 17 or chamber between the sheets. The present invention is concerned primarily with a glazing unit of this general type which is made entirely of glass. These so-called all-glass units are made by first heating the marginal edge portions of the spaced sheets to the softening temperature of glass and then urging the pliable edge portions toward and into fusion contact with one another to form an edge wall 18 extending around the unit.

As mentioned above, the insulating qualities of multiple sheet glazing units are ofttimes not sufficient to avoid the condensation of moisture on the room-side surface of the window. Since the condensate is unsightly and does interfere with the intended purpose of the window, it is desirable that the glass sheets be maintained in a condition which discourages the condensation of moisture from the room atmosphere on their surfaces. To this end, the present invention contemplates a novel window unit for use on refrigerator cabinets which retards the formation of condensation on the window and rapidly dissipates any condensation which may form under the most adverse room atmospheric conditions. Broadly, this is accomplished through the medium of a heating means 19 associated with the glazing unit and adapted to maintain the temperature of the room-side surface of the glazing unit above the dew point temperature of the atmosphere. In accordance with the present invention, a simply constructed, substantially trouble free but efficient heating means is provided, which heating means has a minimal effect on the efficiency of the refrigerator unit and which is substantially invisible and thus does not frustrate in any way the intended purpose of the window.

Further in accordance with the invention, the heating means 19 is located in an out-of-the-way position so as not to interfere with the operation of the refrigerator unit or with the opening and closing of the door 12 when the glazing unit 10 is mounted in the door. For this purpose, the heating means 19 is disposed in the air space 17 between the glass sheets 14 and 15 of the glazing unit and is thus protected by the glass sheets from both chemical and physical damage. In a preferred embodiment, the heating means is designed to apply heat directly to the inner surface of the room-side sheet of the glazing unit. This arrangement has been found to have at least two definite advantages. First, since condensation presents the greatest problem as regards the room-side surface of the glazing unit, heat applied directly to the room-side glass sheet is most effective in reducing or eliminating the problem. Second, the dead air space 17 between the glass sheets 14 and 15 retards the transfer of heat from the room-side sheet into the refrigerated compartment whereby the heat has but a minimal effect upon the efficiency of the refrigerated unit. The transfer of heat, however, is not completely prevented and, therefore, when the refrigerated compartment is opened and condensation forms on the cabinet-side surface of the glazing unit, enough heat is conveyed to the cabinet-side sheet to dissipate the moisture and prevent the formation of a heavy layer of frost when the door is again closed.

All of the foregoing requirements are met in the present invention by the simple but novel expedient of utilizing a transparent electrical conductive film 20 placed on the inner surface of the room-side glass sheet of the multiple sheet glazing unit 10. By using a film adherent directly to one surface of the glass sheet to be heated, the maximum amount of heat may be efficiently utilized with a minimum expenditure of energy. In addition, since this film 20 is placed on the inner surface of the sheet and is thus in an inaccessible location, it is mechanically protected from damage due to marring or scratching, which would impair the operation of the film. Moreover, in this way, the glass sheets 14 and 15 act as an insulator to ensure that the electricity will not be conducted outwardly of the unit 10.

It is not intended that the present invention be limited to a film of any particular composition but rather that any film which meets the requirements outlined above as regards transparency and electrical conductivity may be utilized.

By way of example, it has been found that very good results may be obtained with a film of tin oxide. Following well established procedures, such a film may be applied by heating the glass sheet to substantially its softening point and, while at this elevated temperature, spraying its surface with a filming liquid by means of a conventional spray gun or the like. The filming liquid may comprise tin chlorides including hydrated stannous chloride and hydrated stannic chloride, isopropyl alcohol and a suitable activator, which liquid reacts with the hot glass when sprayed thereon to leave a thin, transparent, tightly adherent, electrically conducting film of tin oxide on the glass. After being sprayed, the sheets may either be air cooled or tempered according to conventional procedures to modify the physical characteristics of the glass.

After the sheet is filmed as outlined above, to facilitate supplying electrical power thereto, metallic electrodes 21 or bus bars are fixed to the sheet so as to overlie the film. At least two such electrodes are utilized and these electrodes are secured to the sheet in spaced relationship so that the electrical current flows between the electrodes and through the film.

A number of different films having a variety of electrical characteristics may be utilized in the practice of the invention. For a film of any given composition, its characteristics will depend upon the size of the filmed area, the required heat energy output, the voltages to be applied across the film and the thickness of the film. Thus films having different resistivities may be used to enable operating the units on various voltages ranging from 220 volts on down.

For example, let it be assumed that a unit is to be used as a window on a refrigerator cabinet in which the refrigerated compartment is to be maintained at about $-10°$ F. In this situation it has been found that the desired energy output would be 15 watts per square foot. Further, assuming that the size of the sheets used in the window is 22 inches by 52 inches and that the filmed area of the one sheet measures 20½ inches by 51 inches. If this unit is to be operated with line voltage or with approximately 115 volts across the film, the resistivity of the film should be in the order of 276 ohms per square. Tin oxide films exhibiting these characteristics applied in the manner described above are, of course, well known in the art.

In any situation where there is any likelihood of the glass sheets forming the unit being broken and of persons coming into contact with the film or electrodes, the possibility of these persons being injured by electric shock may be eliminated by operating the unit on 24 volts or less.

To operate a unit having the same basic dimensions as the unit discussed above and under the same conditions on 24 volts, the resistivity of the film should be in the order of 13 ohms per square, which, of course, requires a film of greater conductivity than that used in the foregoing example. This film may be of a tin oxide composition formed by applying the filming liquid described above by making two passes with the spraying apparatus. To elaborate, the sheet to be filmed is heated to its softening point and the filming liquid sprayed upon the hot surfaces to produce a tin oxide film having a resistivity of approximately 20 ohms per square. Then the sheet is reheated and sprayed again to produce a film having a resistivity of 13 ohms per square; the desired value. The double spraying procedure enables obtaining a thicker film; one having greater conductivity and, therefore, less resistivity.

It is emphasized that the foregoing illustrations are merely examples of units embodying the features of the present invention and that the invention is not limited to the use of any particular manner of applying the film or any particular size of unit.

Figure 3:
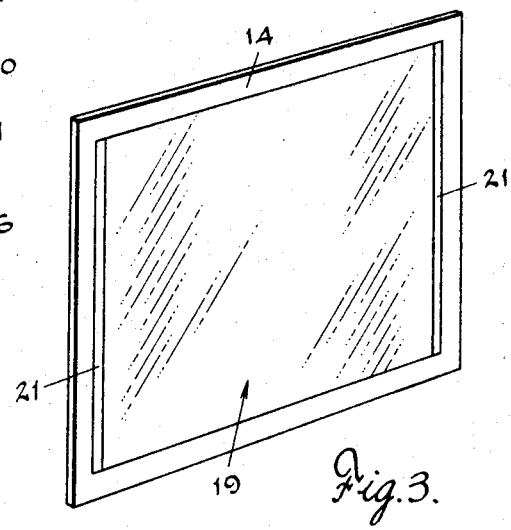
FIG. 3 is a perspective view of one of the glass sheets of a multiple sheet glazing unit having an electrically conductive coating applied thereto.

In order to ensure that the completed unit 10 is electrically insulated and to prevent the film 20 or the electrodes 21 from interfering with the fabrication of the glazing unit, the film is placed only on preselected areas of the sheet, which areas terminate inwardly of the outer edges of the glass sheets (FIG. 3). Then, when the edge wall 18 of the unit is formed, it acts as an insulator between the conductive film and the exterior of the unit.

The electrodes 21 are coupled to a source of electrical energy (not shown) through the medium of flexible conductors 22 such as wires passing through the separator means 16 and fixed, as by soldering, to the electrodes 21. In accordance with another aspect of the invention, these flexible conductors or lead-in wires 22 are attached to the unit 10 after the unit itself has been completely assembled whereby the wires will not interfere in any way with the fabrication of the unit. To this end, a small opening which may be easily closed to hermetically seal the air space is provided in the edge wall for the wire and the wire is securely affixed as by soldering to the electrode through the medium of induction heating which avoids localized intense heating of any areas of the glass to effect the melting of the solder.

Figure 4:
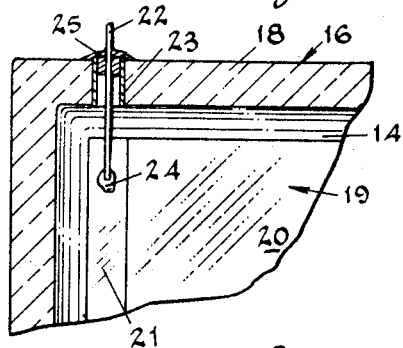
FIG. 4 is a fragmentary sectional view taken along line 4—4 in FIG. 2.
Figure 5:
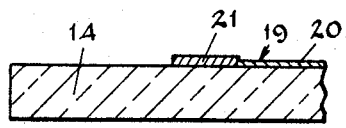
FIG. 5 is a fragmentary sectional view of one of the sheets of a multiple sheet glazing unit showing the electrically conductive film and the bus bar applied thereto.

As best shown in FIG. 4, the opening is provided in the edge wall through the medium of an apertured metal insert 23 which is fused directly into the edge wall as the latter is formed by following known procedures. In the illustrated embodiment two such inserts 23 are provided spaced apart along one side of the unit with one insert adjacent each of the electrodes 21. In attaching the electrical conductors 22 to the electrodes, a suitable flux is applied to the electrodes by inserting a flux wire through the aperture in the metal insert 23 and thereby depositing a small quantity of flux on the electrode. Next, a small bead of solder is pushed through the aperture in the insert and moved into the desired position on the electrode again by manipulating a small rod or wire through the insert. Then the prepared end of the flexible conductor is threaded through the insert and brought into position against the fluxed portion of the electrode and in contact with the small bead of solder. A conventional induction heater placed against the outer surface of the filmed glass sheet in the vicinity of the conductor heats the electrode and the conductor by induction to a temperature sufficient to melt solder and effect a solder joint 24 between the electrode and the conductor. As a final step, the opening surrounding the conductor is closed to ensure hermetic sealing of the air space. By utilization of the metal insert, this closing may be simply but effectively accomplished by a body of solder 25 deposited in the conventional manner.

Various experiments were performed on glazing units of different sizes constructed in accordance with the invention, which experiments substantiate that the units perform their intended function efficiently and economically with a minimum of upkeep aand service being necessary. Briefly, these experiments included mounting the glazing units on refrigerated cabinets while the latter were loaded with a frozen sawdust and water mixture and operated at temperatures from −5° F. to 0° F. The conditions, such as temperature and relative humidity, of the room atmosphere were varied throughout the tests in order to ascertain the invention's effectiveness through all of the conditions the units could reasonably be expected to be exposed to throughout their service life. The following examples indicate the results of these experiments:

Example I

A glazing unit measuring 24⅜ by 25⅝₁₆ with a ½ inch air space was mounted on a cabinet, the refrigerated compartment of which was maintained at approximately 0° F. The filmed area of the unit was 4.3 sq. ft. and power was supplied to the film at 15 watts per sq. ft. Readings were taken at room temperatures of 85° F., 90° F. and 95° F. while the relative humidity in the room ranged from 60% to 70%. The average room-side surface temperature of the unit at each of the above room temperatures were found to be 91° F., 95° F. and 99° F. respectively. The corresponding cabinet-side surface temperatures at these conditions were 63° F., 68° F. and 70° F. Throughout these tests it was found that when the door of the refrigerated cabinet was closed, no condensation occurred on either the room-side surface or cabinet-side surface of the glazing unit. When the door was opened exposing the chilled cabinet-side surface of the unit, condensation formed on this surface, however, this condensation was rapidly dissipated and thus was not frozen into the undesirable frost when the cabinet door was closed. By calculations well known in the field of psychrometrics, it was determined that the condensation would occur on the cabinet-side surface of the glazing unit at relative humidities ranging from 40% to 50%.

Example II

The above-identified glazing unit was also tested under identical room atmosphere conditions with power supplied at 8 watts per sq. ft. The average room-side surface temperatures under these conditions were 79° F., 85° F. and 88° F. at the three room temperatures identified above. The corresponding cabinet-side surface temperatures of the unit were 57° F., 61° F. and 63° F. Here again, when the door of the cabinet was closed, no condensation appeared on either side of the glazing unit. However, when the door was open, condensation appeared on the cabinet-side surface of the glazing unit but, once more, this condensation was rapidly dissipated upon closing the door and therefore did not present a problem. Calculations revealed that condensation would form on the cabinet-side surfaces at the room temperatures set out above at relative humidities of 38% to 39%. Similar calculations indicate that moisture would condense on the room-side surface at relative humidities between 80% and 82%. It will be appreciated that the latter percentages of relative humidity are high and under ordinary conditions would not be experienced. If the refrigerator cabinet were to be used in climates where these conditions persist, compensation could easily be made by increasing the power supply to the film.

Example III

Identical tests performed under the same room conditions as prevailed in Examples I and II were made on a unit measuring 22⅝ by 28⅝₁₆ and having a ¼ inch air space, the filmed area of this unit being 3.98 sq. ft. When power was supplied to the film at 15 watts per sq. ft. at the three test room temperatures, the temperatures of the room-side surface of the glazing unit were 89° F., 91° F. and 93° F. The corresponding cabinet-side surface temperatures were 68° F., 71° F. and 73° F. No condensation occurred in any of these conditions when the door of the cabinet was closed. When the door of the cabinet was open, condensation appeared on the cabinet-side surface at calculated relative humidities ranging between 49% and 57% but, as before, this condensation rapidly disappeared when the door was again closed and thus presented no problems. Again by calculation, it was determined that when the room temperature is maintained at 95° F., condensation could be expected to appear on the room-side surface of the unit at a relative humidity of 95%. This condition could be expected only under the most adverse conditions if at all and, therefore, the fact that condensation would form in this very humid atmosphere is not felt to detract from the advantages of a unit constructed in accordance with the present invention.

*Example IV*

A similar test was performed on the unit of Example III with power being supplied at 11.5 watts per sq. ft. The room-side surface temperatures at each of the test conditions were 81° F., 86° F. and 88° F. respectively and the cabinet-side surface temperatures of the unit were 64° F., 68° F. and 68° F. With the refrigerator door in the closed position, no condensation appeared on either surface of the glazing unit at the test room conditions. With the door open, condensation appeared on the cabinet-side surface at calculated relative humidities ranging between 41% and 49%. In every instance, however, it is to be emphasized that the condensation which appeared on the cabinet-side surface of the unit when the door of the cabinet was open, was rapidly dissipated when the door was again closed and presented no problem. Calculations, based on the room temperatures at test condition, reveal that moisture would condense on the room-side surface of the unit at relative humidities above 80% to 88% which would, of course, be higher than the percentage normally encountered.

Admittedly, the test ranges of both room temperature and relative humidity were high but the intention of the experiments was to test the units under the most adverse conditions. By a suitable switching arrangement, provision could be made to supply power to the filmed area of the unit only under these adverse conditions. In other words, under the room conditions which would ordinarily be encountered, the supply of power to the filmed area could be interrupted and the inherent insulating properties of the multiple sheet glazing unit would be sufficient to prevent the formation of condensation on the surfaces of the glazing unit.

It is to be understood that the forms of the invention herewith shown and described are to be taken as illustrative embodiments only of the same, and that various changes in the shape, size and arrangement of parts may be resorted to without departing from the spirit of the invention.

I claim:

1. In a method of producing all-glass multiple sheet glazing units, the steps of, applying a transparent electrically conductive film to a surface on a first glass sheet, supporting a second glass sheet in spaced face-to-face relation to said surface on said first glass sheet, heating the marginal edge portions of said sheets to the fusion temperature of glass, positioning a tubular metallic insert between said heated portions, urging the heated edge portions toward one another and into fusion contact to form a peripheral edge wall enclosing an air space between the sheets and to seal said insert in the edge wall, inserting one end of a wire conductor through said insert and into contact with said film effecting a solder joint between said one end of said conductor and said film by heating said film and said conductor through one of said glass sheets by induction, and closing said insert around said conductor to hermetically seal said air space.

2. In a method of producing all-glass multiple sheet glazing units, the steps of, applying a transparent electrically conductive film to a surface of a first glass sheet, supporting a second glass sheet in spaced face-to-face relation to said surface of said first glass sheet, heating the marginal edge portions of said sheets to the fusion temperature of glass, positioning an apertured insert between said heated portions, urging said heated portions into fusion contact to form an edge wall enclosing an air space between the sheets with the insert embedded in said edge wall, introducing a small body of solder through said insert and onto said film, threading one end of a wire conductor into said air space to contact said solder and said film, heating said conductor through said first glass sheet from the outside by induction to melt said solder thereby to secure said one end of said conductor to said film, and closing the aperture in said insert around said conductor to hermetically seal said air space.

3. In a method of producing multiple glass sheet glazing units, the steps of applying a transparent electrically conductive film to preselected areas of a surface of a first glass sheet, said areas being spaced inwardly of the marginal edges of said first sheet, securing metallic electrodes to said surface of first glass sheet along opposed edges of said film, supporting a second glass sheet in spaced face-to-face relation to said surface of said first glass sheet, heating the marginal edge portions of said sheets to the fusion temperature of glass, positioning an apertured insert between said heated portions adjacent each of said electrodes, urging said heated edge portions into fusion contact to form a peripheral edge wall enclosing an air space between the sheets with said inserts being embedded in said edge wall, introducing a body of solder through each of said inserts and onto said electrodes, threading one end of a wire conductor through each of the inserts and into contact with said solder and said electrode, heating said solder, said electrode and said conductor through said first glass sheet by induction to melt said solder and thereby secure said one end of said conductors to said electrodes, and closing said inserts around said conductors to hermetically seal said air space.

References Cited

UNITED STATES PATENTS

| | | | |
|---|---|---|---|
| 2,030,117 | 2/1936 | Page | 219—522 X |
| 2,389,360 | 11/1945 | Guyer et al. | 65—40 |
| 2,513,993 | 7/1950 | Burton | 29—611 X |
| 2,543,093 | 2/1951 | Braunsdorff | 29—611 X |
| 2,625,640 | 1/1953 | Gaiser et al. | 219—522 |
| 3,041,436 | 6/1962 | Brady | 29—611 X |
| 3,177,345 | 4/1965 | Plumat | 219—522 X |

CHARLIE T. MOON, *Primary Examiner.*